March 9, 1937.                 J. B. WEBB                 2,073,131
                               CONVEYER
                          Filed June 13, 1934

INVENTOR
JERVIS B. WEBB
BY Joseph Farley
ATTORNEY

Patented Mar. 9, 1937

2,073,131

UNITED STATES PATENT OFFICE 2,073,131

CONVEYER

Jervis B. Webb, Royal Oak, Mich.

Application June 13, 1934, Serial No. 730,426

11 Claims. (Cl. 198—177)

This invention relates to conveyer systems used in modern industrial plants for conveying parts or material from one part of the plant to another. An endless chain system supported on a suitable track is provided and in the specific type of conveyer with which we are concerned herein, an overhead track is used below which the chain is supported at suitable intervals from small car units or trolleys. Each of these car or trolley units are also provided with means for suspension of the articles to be carried. At one or more stations in the line of travel of the conveyer system there are provided suitable driving units with sprockets to contact the chain, thereby keeping the system operating at a predetermined rate.

It is one of the objects of this invention to provide improvements in construction of trolley units for a conveyer system whereby as a result of reducing the number of parts required and simplifying the construction of such parts, not only is the assembly of the units facilitated but interchangeability of the parts is obtained. These features are very important from the standpoint of maintenance and the adaptability of a conveyer system to changing conditions. With my improved construction it is possible to add trolley units to a system to meet increased demands without unreasonable delay or to reduce the number of units as desired. The assembly is facilitated by having the trolley made up of two identical brackets of such novel construction as to fit together and maintain a rigid connection with the conveyer chain while using only a single bolt as a fastening means.

The above and other objects of the invention will appear more fully from the following more detailed specification and by reference to the accompanying drawing forming a part hereof, and wherein.

Figure 1:
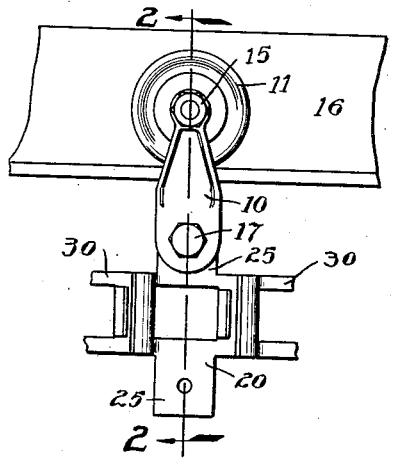
Fig. 1 is a side view showing one of the trolley units assembled with the track and chain.
Figure 2:
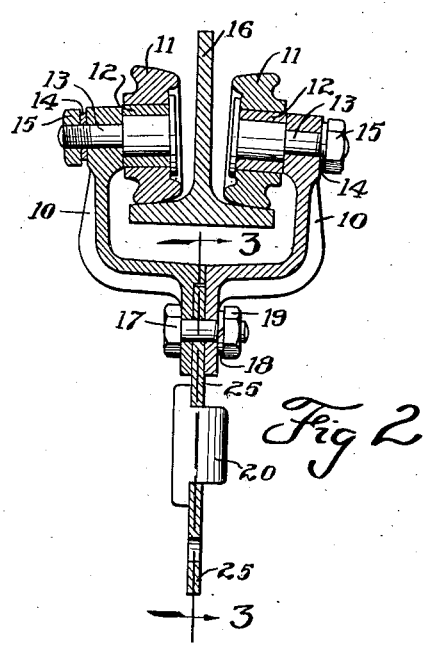
Fig. 2 is a section taken on line 2—2 of Fig. 1.
Figure 3:
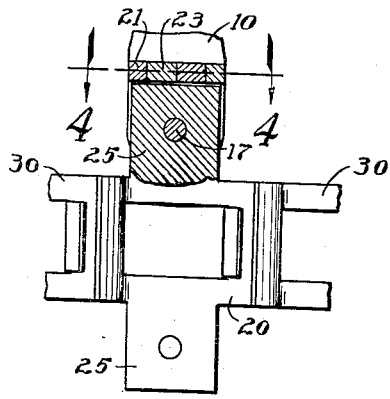
Fig. 3 is a side view partly in section, said section being taken on line 3—3 of Fig. 2.
Figure 4:
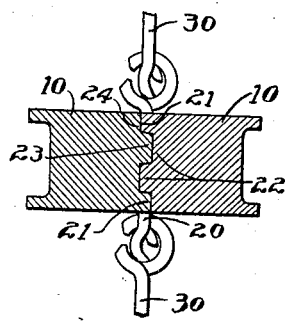
Fig. 4 is a section taken on line 4—4 of Fig. 3.

Referring to the drawing Figs. 1, 2, 3, and 4, the details of a trolley constructed according to my invention are shown. Using reference characters to designate the several parts thereof, the trolley is made up of two identical brackets 10, upon which trolley wheels 11 are rotatably mounted by means of bushings 12, shafts 13, lock washers 14 and nuts 15. The trolley is suspended from the conventional T-rail type of track 16. A single fastening bolt 17, with its spring washer 18 and nut 19, hold the two identical trolley brackets together and also secures between the two brackets a projection 25 of the attachment link 20. Each bracket 10, as shown in Figs. 2, 3, and 4, is provided with projections or lugs 21 and 23 and recesses 22 and 24. The recess 24 is of a shape required to receive a lug 21 and recess 22 is of a shape required to receive a lug 23.

The conveyer chain is made up of links 30 and special attachment links 20. As many special attachment links 20 may be put in the chain as may be expected to meet requirements in operation. Whether or not a trolley is connected at once is immaterial since links 20 differ from conventional links 30 only by the addition of the identical projections 25 above and below. The upper projection is used to secure the chain to the trolley and the lower one is used as a hangar for the articles to be carried.

From the foregoing description it is evident that the two brackets 10 are of identical construction and are held together with a space provided for also securing the projection 25 of the attachment link 20. The usual disadvantage in the use of a single bolt to hold three parts together is the tendency of these parts to move relative to each other about the axis of the bolt. With the present invention however this disadvantage is overcome by the provision of the lugs and recesses in the mating parts of the trolley brackets which prevent relative movement and hold the parts rigid. Also the novel construction herein disclosed renders it possible to make the two trolley brackets 10 identical with the same lug design 21 and 23 on both. Furthermore when the two brackets 10 are fitted together a straight shoulder is formed against which the top edge of projection 25 on the attachment link 20 fits, and no lug of special shape is required on the said attachment link.

It is evident from the above that when the two brackets 10 are fitted and bolted together with the projection 25 of attachment link 20 in abutment with the shoulder formed by the lugs 21 and 23, and with the lugs 21 and 23 interlocked in engagement with their respective recesses 22 and 24 rotation or other movement of the two brackets relative to each other is prevented and that the contact of projection 25 of attachment link 20 with the straight shoulder formed by lugs 21 and 23 prevent rotation or movement of the link 20 relative to the brackets 10.

The construction might be otherwise described as providing a clevis for connection of the lug or projection 25 of a load carrying bracket, such as chain link 20, to the lower end portions of the two trolley brackets, the interlocking projections 21, 23 serving to hold the lower end portions apart to form the clevis and said projections 21, 23 fitting together to form a connection across the top equivalent to the upper portion of said clevis. Also the bolt 17 might be described as a clevis pin and the lug 25 is securely held against rotation around this single fastening because of the fact that an edge of the lug 25 abuts the shoulder formed by the projections 21 and 23, which projections also serve to form the upper portion of the clevis.

It will be seen that because of the use of the identical bracket members 10 and the single fastening bolt 17 to secure them together, the trolley can be assembled and disassembled with great facility. The removal of but one bolt 17 permits any one entire trolley to be removed from the track and chain, while leaving the chain system and other trolleys undisturbed. Furthermore it is possible to add complete trolleys or change parts at any time without unreasonable delay.

It is evident that various changes, substitutions, variations and modifications might be resorted to, without departing from the spirit and scope of my invention, and hence I do not desire to limit myself to the exact and specific disclosures hereof.

Desiring to protect my invention in the broadest manner legally possible, what I claim and desire to secure by Letters Patent of the United States is:—

1. In a conveyer system the combination, a track, a trolley suspended from said track, said trolley comprising two separable parts, projections on said separable trolley parts contacting each other and so disposed as to prevent relative movement between said parts and to hold the lower end portions of said parts in spaced relation, a chain below said trolley, a connecting lug on said chain disposed between the lower end portions of said separable trolley parts and having an edge thereof contacting the said projections on said separable trolley parts and a single fastening means projecting through said separable trolley parts and said connecting lug.

2. In a conveyer system the combination of, a track, a trolley suspended from said track, said trolley comprising two separable parts, projections on said separable trolley parts so disposed as to prevent relative movement between said parts and to hold the lower end portions of said parts in spaced relation, a load carrying unit below said trolley, a connecting lug on said load carrying unit disposed between the lower end portions of said separable trolley parts and having an edge thereof contacting the said projections on said separable trolley parts.

3. In a conveyer system the combination of, a track, a trolley suspended from said track, said trolley comprising two separable parts, interlocking projections on said separable trolley parts so disposed as to prevent relative movement between said parts and to hold the lower end portions of said parts in spaced relation, a load carrying unit below said trolley, a connecting lug on said load carrying unit disposed between the lower end portions of said separable trolley parts and a fastening means projecting through said separable trolley parts and said connecting lug.

4. A trolley for suspending a load for transportation below an overhead track comprising, a pair of oppositely disposed trolley wheels, a pair of depending brackets upon which said oppositely disposed trolley wheels are mounted, characterized by, projections on said depending brackets so disposed as to prevent relative movement between said brackets and to hold the lower end portions of said brackets in spaced relation, a connecting lug for supporting said load disposed between the lower end portions of said depending brackets and having an edge thereof contacting the said projections on said depending brackets and a fastening means projecting through the said depending brackets and said connecting lug.

5. A trolley for suspending a load for transportation below an overhead track comprising, a pair of oppositely disposed trolley wheels, a pair of depending brackets upon which said oppositely disposed trolley wheels are mounted, characterized by, projections on said depending brackets so disposed as to prevent relative movement between said brackets and to hold the lower end portions of said brackets in spaced relation, a connecting lug for supporting said load disposed between the lower end portions of said depending brackets and having an edge thereof contacting the said projections on said depending brackets and fastening means for holding said depending brackets and said lug together.

6. A trolley for suspending a load for transportation below an overhead track comprising, a pair of oppositely disposed trolley wheels, a pair of depending brackets upon which said oppositely disposed trolley wheels are mounted, characterized by, interlocking projections on said depending brackets so disposed as to prevent relative movement between said brackets and to hold the lower end portions of said brackets in spaced relation, a connecting lug for supporting said load disposed between the lower end portions of said depending brackets and fastening means for holding said depending brackets and said lug together.

7. A trolley for suspending a load for transportation below an overhead track comprising, a pair of oppositely disposed trolley wheels, a pair of depending brackets upon which said oppositely disposed trolley wheels are mounted, characterized by, projections on said depending brackets so disposed as to prevent relative movement between said brackets and to hold the lower end portions of said brackets in spaced relation, a connecting lug for supporting said load disposed between the lower end portions of said depending brackets and having an edge thereof contacting the said projections on said depending brackets.

8. In a conveyer trolley having separable parts, projections on said parts so disposed as to prevent relative movement between said parts and to hold the lower end portions of said parts in spaced relation thereby forming a clevis, a clevis pin, a load carrying bracket, a lug on said bracket for connection to said clevis by said clevis pin with an edge of said lug abutting said projections.

9. In a conveyer trolley having separable parts, interlocking projections on said parts so disposed as to prevent relative twisting movement between said parts and to hold the lower end portions of said parts in spaced relation thereby forming a clevis, a clevis pin, a load carrying bracket, a lug on said bracket for connection to said clevis by said clevis pin.

10. In a conveyer system the combinaton of a track, a trolley suspended from said track, said trolley comprising two separable parts, a pair of wheels in engagement with said track and carried by said trolley, projections on said parts so disposed as to contact each other to prevent relative twisting movement between said parts and to hold the lower end portions of said parts in spaced relation thereby forming a clevis; a load carrying bracket, a lug on said bracket for assembly between said lower end portions, a single clevis pin fastening means projecting thru said lower end portions and said lug thereby forming the sole means for holding said lug in said clevis and for holding said separable trolley parts together.

11. In a conveyor trolley having separable parts, interlocking projections on said parts so disposed as to prevent relative twisting movement between said parts and to hold the lower end portions of said parts in spaced relation thereby forming a clevis, a load carrying bracket, a lug on said bracket for assembly between said lower end portions, and a single clevis pin fastening means projecting thru said lower end portions and said lug thereby forming the sole means for holding said lug in said clevis and for holding said separable trolley parts together.

JERVIS B. WEBB.